United States Patent [19]
Tylaska

[11] Patent Number: 5,769,475
[45] Date of Patent: Jun. 23, 1998

[54] SHACKLE APPARATUS

[76] Inventor: Timothy Tylaska, 138 N. Stonington Rd., Mystic, Conn. 06355

[21] Appl. No.: 724,846

[22] Filed: Oct. 3, 1996

[51] Int. Cl.$^6$ .................................................. F16G 15/08
[52] U.S. Cl. ........................ 294/82.2; 24/600.1; 24/601.5
[58] Field of Search .............................. 24/601.5, 600.1, 24/599.1, 599.5; 294/82.33, 82.2

[56] References Cited

U.S. PATENT DOCUMENTS

| | | | |
|---|---|---|---|
| 1,233,376 | 7/1917 | Link | 294/82.33 |
| 3,930,290 | 1/1976 | Mangels | 24/601.5 X |
| 4,093,293 | 6/1978 | Hugget | 24/600.1 X |
| 4,279,062 | 7/1981 | Boissonnet | 24/601.5 X |

FOREIGN PATENT DOCUMENTS

| | | | |
|---|---|---|---|
| 519699 | 10/1957 | Italy | 294/82.33 |
| 88996 | 4/1921 | Switzerland | 294/82.33 |

Primary Examiner—James R. Brittain
Attorney, Agent, or Firm—William B. Ritchie; Michael J. Persson

[57] ABSTRACT

An improved shackle apparatus that introduces improvements to the basic shackle design to allow for easy release under load, a high strength to weight ratio, and low wear on sliding surfaces. Easier release under heavy load is accomplished with a nonsymmetrical trigger hole design. The contour of the trigger hole pushes the fid to the side of the trigger, thus producing greater leverage on the trigger that would have been applied with the same amount of force as originally applied to the fid. Internal design of the improved shackle apparatus has incorporated the trigger spring in the shank resulting in a simplified design while providing for a high strength to weight ratio. Likewise, a reinforced trigger pivot pin hole improves tensile strength and increases the bearing contact area of the trigger. Low wear on sliding surfaces is aided by a new "cam action" hook design that allows the rope to roll over the hook area instead of sliding. As the hook completely opens, the offset distance of the "cam action" design decreases until the hook and the shackle casing meet in a smooth transition.

20 Claims, 3 Drawing Sheets 5,769,475

SHACKLE APPARATUS

The application claims the benefit of U.S. Provisional Application No. 60/004,943, filed Oct. 14, 1995.

BACKGROUND OF THE INVENTION

1. Field of the Invention

The invention relates to shackles used for joining two members under tension.

2. Description of the Related Art

The technique of attaching two members together under tension, such as rope or cable, can be accomplished with the use of a shackle. A variety of improvements have been introduced upon the standard shackle design. For instance, U.S. Pat. No. 3,850,468, issued to Hultin on Nov. 26, 1974, discloses a chain-like articulation permitting a more direct load between the attaching rope and its point of attachment.

In the utilization of a shackle, it is desirable to have a fast, reliable means for releasing two members under tension. Releasing sails from sailboats or releasing cables used in industrial rigging fixtures are just a few of the many places where this need is encountered. U.S. Pat. No. 5,195,223 issued to the inventor on Mar. 23, 1993, discloses a quick release mechanism which has a required triggering force that remains constant, regardless of the tension being constrained. This invention teaches us an equation which yields a logarithmic spiral solution set that provides the configuration necessary to achieve this objective. However, the inventor's '223 patent addresses the contour of the sliding curvature on external surfaces and not any of the shortcomings associated with current shackle designs.

One such shortcoming of shackle designs is associated with the trigger. Existing shackle designs have a bottom protrusion on the trigger such that the protrusion contacts an internal step inside the shackle case which in turn acts as a stop to limit the trigger movement. The disadvantage with this arrangement is that small changes in tolerance between the protrusion and the shackle case result in much larger rotations of the trigger. Typically, effects on tolerance have a 2 or 3 to 1 effect to trigger movement. A tolerance having a 1 to 1 effect on trigger movement is desired. In addition, the internal step inside the case serves as another place to trap salt and sand. With the build up of such deposits, the trigger may not be permitted to close completely. This would lead to dangerous situations where the shackle could accidentally open.

Another shortcoming involves opening a shackle under heavy load. The general method is to stick a metal bar, called a fid, into the trigger hole to pry the trigger open. Under extreme loadings near the breaking strength of the shackle, physical deformation of the components begins to occur. A substantial force must then be applied to the fid to pry open the trigger. This is characteristic of existing trigger shackles designed with a symmetric trigger hole. A symmetrical trigger hole causes the moment applied to the trigger to be directly related to the length of the lever arm from the fid's contact point to the trigger's pivot point. Ideally, the same amount of force applied to the fid would produce a greater amount of force on the trigger, thus allowing easier opening under such extreme cases.

Furthermore, existing trigger designs place the hook retaining pin hole through the center of the hook. In this configuration, the rope or rope ring "rolls" off the shackle casing arm while pressing on the hook instead of merely sliding off the shackle casing arm while pressing on the casing surface. This arrangement promotes burrs that occur between the sides of the clevis and hook when a sail rope ring repeatedly slides against the front arm of the shackle casing. This eventually causes the metal on the inside of the front arm clevis to extrude inward, pinching the hook. In other words, as the hook is opened, a smooth transition is not provided for the rope or rope ring as it slides off the hook. An apparatus that overcomes the shortcomings, as just described on existing shackle designs, is not disclosed in the prior art.

SUMMARY OF THE INVENTION

It is an aspect of the invention to provide an improved shackle apparatus that overcomes the deficiencies of the prior art shackle designs.

It is another aspect of the invention to provide an improved shackle apparatus that simplifies the design of prior art shackle designs.

It is another aspect of the invention to provide an improved shackle apparatus that provides for a more reliable operation.

It is another aspect of the invention to provide an improved shackle apparatus that reduces the wear on the contact surfaces between the nut and bail.

It is another aspect of the invention to provide an improved shackle apparatus that overcomes the undesirable stiffening effect of the trigger spring that results from salt and sand accumulation trapped between the spring coils.

It is another aspect of the invention to provide an improved shackle apparatus that allows oil to be sprayed directly into the spring cavity, thus providing an easy method of flushing out any built up salt or sand accumulation.

It is another aspect of the invention to provide an improved shackle apparatus that limits the trigger's movement with respect to the placement of a protrusion on top of the trigger so that a tolerance having a 1 to 1 effect is achieved.

It is another aspect of the invention to provide an improved shackle apparatus that prevents snags from a rope or rope ring as it slides off the hook under normal conditions.

It is another aspect of the invention to provide an improved shackle apparatus that allows easier opening under extreme stress cases.

It is another aspect of the invention to provide an improved shackle apparatus that allows the use of a fid to produce increased leverage on the trigger when placed in the trigger hole.

It is another aspect of the invention to provide an improved shackle apparatus that is designed so that the passages behind and in front of the trigger are smooth and step-free.

It is another aspect of the invention to provide an improved shackle apparatus that attempts to help reduce the burrs that develop between the sides of the clevis and hook when a sail ring slides off the front arm of the casing repeatedly.

It is another aspect of the invention to provide an improved shackle apparatus that has a stronger design than that of prior art shackle designs.

It is another aspect of the invention to provide an improved shackle apparatus that supports opening of the trigger with the use of a lanyard.

It is a final aspect of the invention to provide an improved shackle apparatus that provides a smooth transition between the shackle casing and the bail.

DETAILED DESCRIPTION OF THE INVENTION

Figure 1:
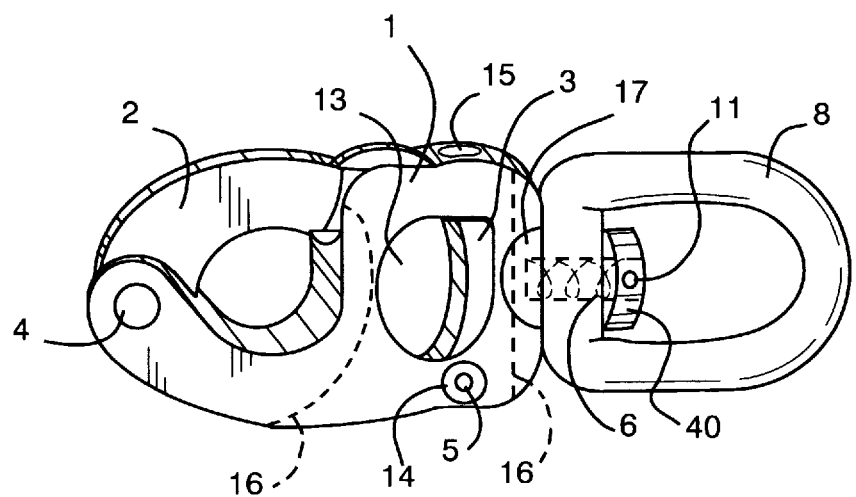
FIG. 1 is an isometric view of the shackle apparatus in its assembled configuration.

FIG. 1 is an isometric view of improved shackle apparatus 10 in its assembled configuration. All components are constructed from high strength 15-5 stainless steel. Other types of material equally durable would be acceptable. The surfaces are highly polished to resist corrosion. While the basic shackle design is well known in the art, the present invention incorporates several improvements which are discussed in the following text.

Shackle 10 consists of shackle casing 1 which utilizes exposed hook 2 and internal trigger 3. Hook 2 is attached to shackle casing 1 by hook pin 4. Likewise, internal trigger 3 is attached to shackle casing 1 by trigger pin 5. Spring 6 is placed behind internal trigger 3 and is housed within the shank 7 (shown in FIG. 4). Bail 8 is placed over shank 7 and is retained in place by nut 40. Nut 40 is threaded onto the shank 7 and is secured in place with cross pin 11. Bail 8 and shackle casing 1 are pivotally connected such that the two components can rotate independently from each other.

Shackle casing 1 contains trigger finger opening 13 that is specifically contoured in accordance with the inventor's issued '223 patent, incorporated herein in its entirety, to produce the highest leverage on internal trigger 3 when a fid (not shown) is placed within trigger finger opening 13 to pry open internal trigger 3. Trigger finger opening 13 is contoured to push the fid (not shown) to the side of internal trigger 3, which in turn produces the best leverage. Up to twice the leverage can be applied to internal trigger 3 with the same amount of force applied to the fid (not shown), thus allowing easier opening under extreme cases.

Raised dimple 14 provides greater structural strength for shackle casing 1 and greater bearing area for pin 5. Inside of shackle casing 1, restriction free internal cavity 16 is smooth and step-free which eliminates areas where salt and sand can become trapped. Shackle casing 1 also contains raised flair 17 to provide a smooth and snag free transition to bail 8.

Figure 2:
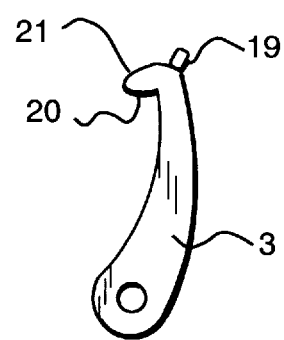
FIG. 2 is a side view of the trigger.

FIG. 2 is a side view of internal trigger 3. Protrusion 19 serves to limit the forward movement of internal trigger 3 by contacting bridge 15 (Reference FIG. 1). This particular configuration makes salt and sand deposits less sensitive to tolerances because one degree of translation with protrusion 19 results in one degree of rotation of internal trigger 3. In other words, tolerances associated with internal trigger 3 movement have a 1 to 1 effect. Thus, the operation of shackle apparatus 10 is less sensitive to salt and sand buildup. Furthermore, the location of protrusion 19 on the top of internal trigger 3 increases reliability and safety of shackle apparatus 10 while simplifying the design.

Figure 3:
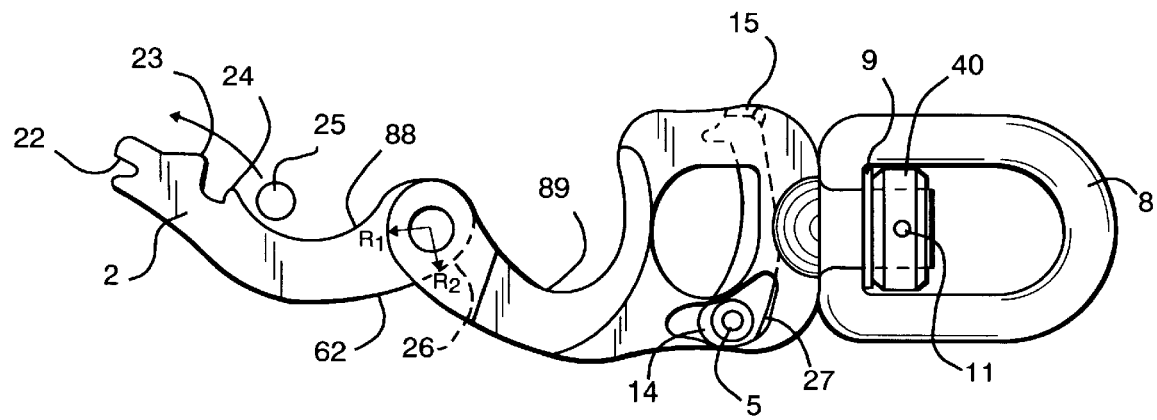
FIG. 3 is a side view of the shackle apparatus with the hook in an open position.

FIG. 3 is a side view of shackle apparatus 10 with hook 2 in an open position. Surface 22 is specifically designed in accordance with the inventor's issued '233 patent. Protrusion 23 serves as a structural stop which slides into shackle casing 1 under severe loadings and prevents hook 2 from deforming in such a manner that allows surface 22 to slide out from underneath surface 20 (Reference FIG. 2). Determination of the curvature of surfaces 88 and 89 for rope 26 to slide off instead of becoming snagged is provided by the inventor's previously issued '233 patent.

Protrusion 24 acts as a ramp causing rope 25 to lift up out of the way before it hits or snags structural protrusion 23 when hook 2 opens under normal release. This allows for a more reliable operation.

Pivot end 62 is designed so that pin 4 is located offset from the center 26. Centerline distance R1 of hook pivot end 62 is offset from true centerline R2 of hook 2. This offset pivot location allows pivot end 62 to rotate in a "cam" type action with respect to shackle casing 1 and thus allows rope 25 to roll off shackle casing 1 using hook 2 as a bearing surface rather than merely sliding off. As hook 2 completely opens, the offset distance decreases until hook 2 and shackle casing 1 meet at a smooth transition.

The offset location of pin 4 also serves to improve the overall strength of shackle casing 1. Pin 4 is a press fit through the shackle casing 1 while it is a loose fit through hook 2. Pin 4 is sized so its outside axial edges are flush with the sides of shackle casing 1 in order to minimize snagging.

Internal trigger 3 is attached to shackle casing 1 via pin 5. Pin 5 is press fitted only through internal trigger 3 in order to allow internal trigger 3 and pin 5 to pivot with respect to fixed shackle shackle casing 1. Pin 5 is sized so its axial edges are also flush with the sides of dimples 14. Raised dimple area 14 increases the cross sectional area to improve tensile strength and to increase the bearing contact area of trigger pin 5. Dimples 14 are optionally located on an additionally raised surface 27, which is used to further increase the strength of shackle casing 1 around the area of trigger pin 5.

Improved shackle apparatus 10 contains a washer type bushing 9 between bail 8 and nut 40 in order to minimize wear and gall after many oscillations between bail 8 and shackle shackle casing 1 under load. While the design of washer bushing 9 is well known in the art, the material used for construction is preferably stainless steel. While monel provides better wear resistance than other types of material, such as bronze and stainless steel, stainless steel is more suitable for higher loadings.

Figure 4:
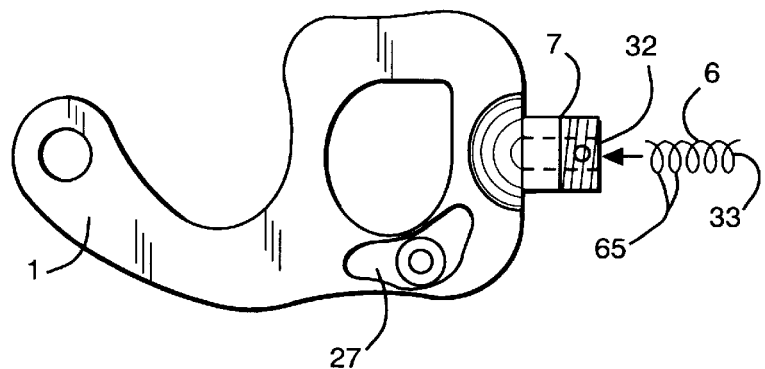
FIG. 4 is a side view of the shackle casing.

FIG. 4 is a side view of shackle casing 1. Spring 6 is located in thru hole 32 of shank 7. Hole 32 is drilled all the way through shank 7 in a longitudinal direction, and spring 6 is placed inside hole 32 which is secured in place with retaining pin 11 (Reference FIG. 2). Pin 11 also serves to secure bail nut 40 (Reference FIG. 2) in place. Thus, the spring serves two important purposes which allows the design of apparatus 10 to be simplified. In addition, since spring 6 is placed inside of shank 7, a long stroke spring 6 can be used. With a longer stroke spring 6, the relative movement of each spring coil 65 with respect to the next is small. Thus, the undesirable "stiffening effect" when salt and sand are trapped between coils 65 is not as great with a long stroke spring design as it is with a short stroke spring design. Since spring force is a function of the spring constant times the displacement, the long stroke spring 6 results in a force profile that is smoother and more uniform than is possible using a short stroke spring design.

A result of placing spring 6 inside shank 7, thru hole 32 allows oil (not shown) to be applied directly into spring cavity 33, providing an easy method of flushing out any build up salt or sand.

Figure 5:
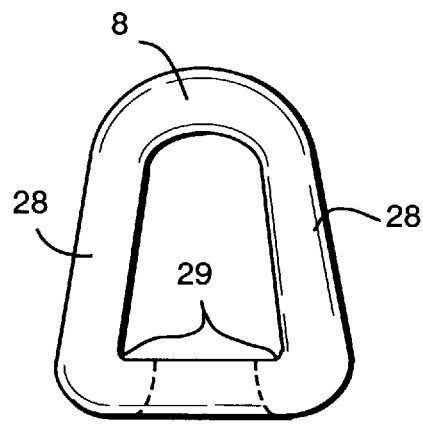
FIG. 5 is a front view of the bail.

FIG. 5 is a front view of bail 8. While the configuration of the standard bail design is well known in the art, it can be optionally reconfigured to reduce stress and provide for a stronger design. Bail 8 is designed with sloped walls 28 that increase the strength of shackle 10 due to lower stresses in corners 29. Walls 28 are sloped at approximately 5 degrees outward.

Figure 6:
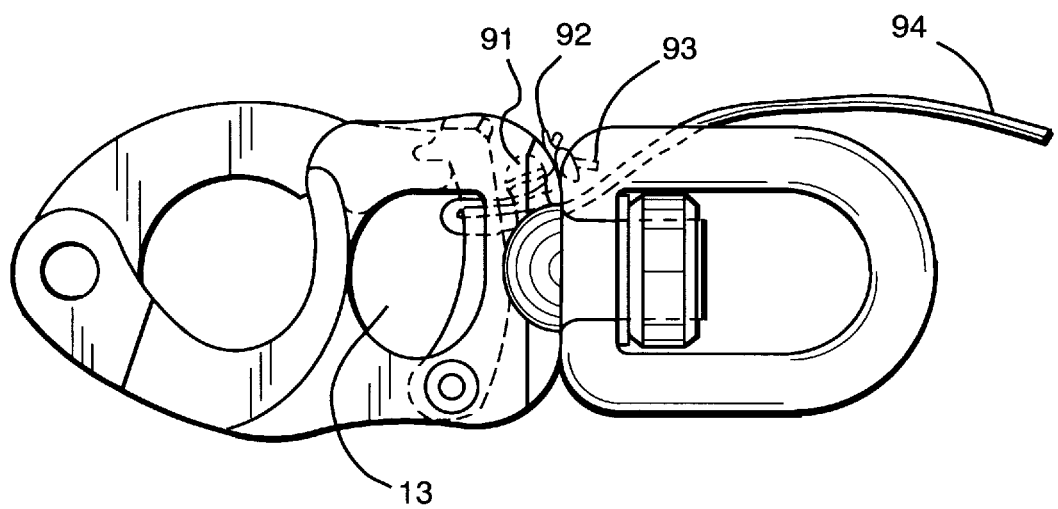
FIG. 6 is a side view of the shackle with an optional lanyard fed through the trigger hole.

FIG. 6 is a side view of shackle 10 with optional lanyard 90 fed through trigger hole 13. Lanyard 90 can be used to open shackle apparatus 10 instead of a fid (not shown). Shackle apparatus 10 contains raised surface 91 behind trigger hole 13. Raised surface 91 contains thru hole 92 which is used for threading lanyard 90. Lanyard 90 is pressed through raised surface 91 and a knot 93 is tied in the end of lanyard 90. End 94 of lanyard 90 is passed through trigger hole 13 and pulled from the opposite side. While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A shackle comprising:
   a shackle casing having a hook opening, a finger opening, and a trigger opening;
   a hook having a centerline, a pivotal end and a locking end; said pivotal end being pivotally connected within the hook opening of said shackle casing by a pin located offset from said centerline;
   a trigger, having a locking end and a pivotal end, said trigger being positioned within the finger opening with its pivotal end being pivotally connected within the trigger opening of said shackle casing;
   a shank rigidly attached to said shackle casing, said shank having a spring opening therethrough such that the spring opening communicates with the finger opening of said shackle casing;
   a bail rotatably attached to said shank such that said bail and said shackle casing can swivel independent of one another; and
   a spring positioned within the spring opening of said shank such that said spring is urged against said trigger; so that when a user urges the locking end of said hook against the locking end of said trigger, said spring is compressed allowing the locking end of said hook to engage the locking end of said trigger until said shackle locks in a closed condition; and so that when said user pulls on said trigger to compress said spring, the locking end of said hook is released from the locking end of said trigger to place said shackle in an open condition.

2. The shackle of claim 1 wherein said finger opening in said shackle casing further comprises a predetermined contour such that when said shackle is in the closed condition and said user places a fid in said finger opening to exert a force to open said shackle, said predetermined contour causes the force against said trigger to be substantially greater than the force applied to the fid.

3. The shackle of claim 1 wherein said shackle casing further comprises a raised dimple surrounding the trigger opening thereby creating a greater bearing area for connecting said trigger to said shackle casing.

4. The shackle of claim 1 wherein said shackle casing further comprises an internal cavity that is smooth and step-free to eliminate areas where salt and sand can accumulate.

5. The shackle of claim 1 wherein said shackle casing further comprises a raised flair to provide a smooth and snag-free transition to said bail.

6. The shackle of claim 1 wherein said shackle casing further comprises a bridge and said trigger further comprises a protrusion on the locking end such that said protrusion contacting said bridge limits the forward movement of said trigger to make said shackle less sensitive to salt and sand build up.

7. The shackle of claim 1 wherein said hook further comprises a predetermined surface at the locking end and wherein said trigger further comprises a corresponding predetermined surface at the locking end, such that said surfaces can slide relative to one another without jamming.

8. The shackle of claim 1 wherein said hook further comprises a first protrusion at the locking end which serves as a structural stop in the closed position when said first protrusion engages said shackle housing.

9. The shackle of claim 8 wherein said hook further comprises a second protrusion adjacent to the locking end to act as a ramp to prevent a line from snagging said first protrusion when said shackle is in the open condition.

10. The shackle of claim 1 wherein said spring has a long stroke so that the movement of each spring coil is small relative to adjacent spring coils so that the sensitivity to sand and salt build-up in said spring is reduced.

11. The shackle of claim 1 wherein said shank further comprises an oil hole such that sand and salt build-up in said spring can be flushed out.

12. The shackle of claim 1 wherein said bail further comprises sloped walls that are sloped approximately 5 degrees outward to increase the strength of said bail.

13. The shackle of claim 1 wherein said trigger further comprises a lanyard hole so that a lanyard can be attached thereto so that pulling said lanyard causes said shackle to change from the closed condition to the open condition.

14. A shackle comprising:
   a shackle casing having a hook opening, a finger opening, a trigger opening and a bridge;
   a hook having a pivotal end and a locking end; said pivotal end being pivotally connected within the hook opening of said shackle;
   a trigger having a locking end, a pivotal end, and a protrusion on the locking end; wherein said trigger is positioned within the finger opening with its pivotal end being pivotally connected within the trigger opening of said shackle casing, and wherein contact between said protrusion and said bridge limits the forward movement of said trigger to make said shackle less sensitive to salt and sand build up;
   a shank rigidly attached to said shackle casing, said shank having a spring opening therethrough such that the spring opening communicates with the finger opening of said shackle casing;
   a bail rotatably attached to said shank such that said bail and said shackle casing can swivel independent of one another; and
   a spring positioned within the spring opening of said shank such that said spring is urged against said trigger; so that when a user urges the locking end of said hook against the locking end of said trigger, said spring is compressed allowing the locking end of said hook to engage the locking end of said trigger until said shackle locks in a closed condition; and so that when said user pulls on said trigger to compress said spring, the locking end of said hook is released from the locking end of said trigger to place said shackle in an open condition.

15. The shackle of claim 14 wherein said finger opening in said shackle casing further comprises a predetermined contour such that when said shackle is in the closed condition and said user places a fid in said finger opening to exert a force to open said shackle, said predetermined contour causes the force against said trigger to be substantially greater than the force applied to the fid.

16. The shackle of claim 14 wherein said shackle casing further comprises an internal cavity that is smooth and step-free to eliminate areas where salt and sand can accumulate.

17. The shackle of claim 14 wherein said hook further comprises a first protrusion at the locking end which serves as a structural stop in the closed position when said first protrusion engages said shackle housing.

18. The shackle of claim 17 wherein said hook further comprises a second protrusion adjacent to the locking end to act as a ramp to prevent a line from snagging said first protrusion when said shackle is in the open condition.

19. The shackle of claim 14 wherein said bail further comprises sloped walls that are sloped approximately 5 degrees outward to increase the strength of said bail.

20. The shackle of claim 14 wherein said trigger further comprises a lanyard hole so that a lanyard can be attached thereto so that pulling said lanyard causes said shackle to change from the closed condition to the open condition.

\* \* \* \* \*